(12) United States Patent
Namiki

(10) Patent No.: US 12,208,529 B2
(45) Date of Patent: Jan. 28, 2025

(54) ROBOT SYSTEM

(71) Applicant: FANUC CORPORATION, Yamanashi (JP)

(72) Inventor: Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 374 days.

(21) Appl. No.: 17/913,321

(22) PCT Filed: Apr. 23, 2021

(86) PCT No.: PCT/JP2021/016401
§ 371 (c)(1),
(2) Date: Sep. 21, 2022

(87) PCT Pub. No.: WO2021/220949
PCT Pub. Date: Nov. 4, 2021

(65) Prior Publication Data
US 2023/0129918 A1  Apr. 27, 2023

(30) Foreign Application Priority Data
Apr. 28, 2020  (JP) .................... 2020-079172

(51) Int. Cl.
*B25J 9/16*  (2006.01)
*B25J 19/00*  (2006.01)

(52) U.S. Cl.
CPC ........... *B25J 9/1697* (2013.01); *B25J 9/1664* (2013.01); *B25J 19/00* (2013.01)

(58) Field of Classification Search
CPC ........ B25J 9/1697; B25J 9/1664; B25J 19/00; G05B 2219/37208; G05B 2219/40607; G05B 2219/45104
See application file for complete search history.

(56) References Cited

U.S. PATENT DOCUMENTS

| | | | |
|---|---|---|---|
| 2019/0200977 A1* | 7/2019 | Shelton, IV | ........... A61B 34/35 |
| 2019/0206565 A1* | 7/2019 | Shelton, IV | ........... A61B 90/90 |
| 2023/0146947 A1* | 5/2023 | Shelton, IV | ....... A61B 17/1285 606/144 |

FOREIGN PATENT DOCUMENTS

| | | |
|---|---|---|
| JP | S61-132274 A | 6/1986 |
| JP | H01-182704 A | 7/1989 |

(Continued)

OTHER PUBLICATIONS

International Search Report mailed Jun. 8, 2021 in corresponding International Application No. PCT/JP2021/016401; 5 pages (w/ partial Machine translation).

*Primary Examiner* — Bhavesh V Amin
(74) *Attorney, Agent, or Firm* — Maier & Maier, PLLC

(57) ABSTRACT

A robot system including: a robot that grips one of a first and second workpiece that are disposed adjacent to each other; an illumination device that radiates light beam onto surfaces of the first workpiece and the second workpiece on either side of a border between the workpieces along a plane that intersects the border; a camera that captures an image containing a first line image of the light beam formed on the surface of the first workpiece and a second line image of the light beam formed on the surface of the second workpiece; and a robot controller that operates the robot based on a misalignment amount and direction of the second line image with respect to the first line image in the image acquired and that performs a correction of a level difference between the surface of the first workpiece and the surface of the second workpiece.

6 Claims, 4 Drawing Sheets

(56) References Cited

FOREIGN PATENT DOCUMENTS

| JP | H03-207577 A | 9/1991 |
|----|--------------|--------|
| JP | H07-117372 B2 | 12/1995 |
| JP | 2005-334957 A | 12/2005 |
| JP | 2008-155285 A | 7/2008 |

* cited by examiner

ROBOT SYSTEM

CROSS-REFERENCE TO RELATED APPLICATIONS

This application is a national phase of International Patent Application No. PCT/JP2021/016401, filed on Apr. 23, 2021, which claims priority to Japanese Patent Application No. 2020-079172, filed on Apr. 28, 2020, the entire contents of which are incorporated herein by reference.

FIELD

The present disclosure relates to a robot system.

BACKGROUND

Regarding corner joint welding of a pair of plate materials, a method in which a slit-like laser beam that is orthogonal to a welding line is radiated onto both plate materials from diagonally thereabove and the optimal position of a welding torch is determined on the basis of projected line images and the crossing angle and the thicknesses of the two plate materials has been disclosed (for example, see Japanese Unexamined Patent Application, Publication No. Hei 3-207577).

SUMMARY

An aspect of the present disclosure is a robot system including: a robot that grips at least one of a first workpiece and a second workpiece that are disposed adjacent to each other; an illumination device that radiates a slit-like light beam onto surfaces of the first workpiece and the second workpiece on either side of a border between the first workpiece and the second workpiece along a plane that intersects the border; a camera that captures, from a direction inclined with respect to the plane, an image containing a first line image of the light beam formed on the surface of the first workpiece and a second line image of the light beam formed on the surface of the second workpiece; and a robot controller that causes the robot to be operated on the basis of a misalignment amount and a misalignment direction of the second line image with respect to the first line image in the image acquired by the camera and that performs a correction of a level difference between the surface of the first workpiece and the surface of the second workpiece.

DETAILED DESCRIPTION OF THE EMBODIMENTS

Figure 1:
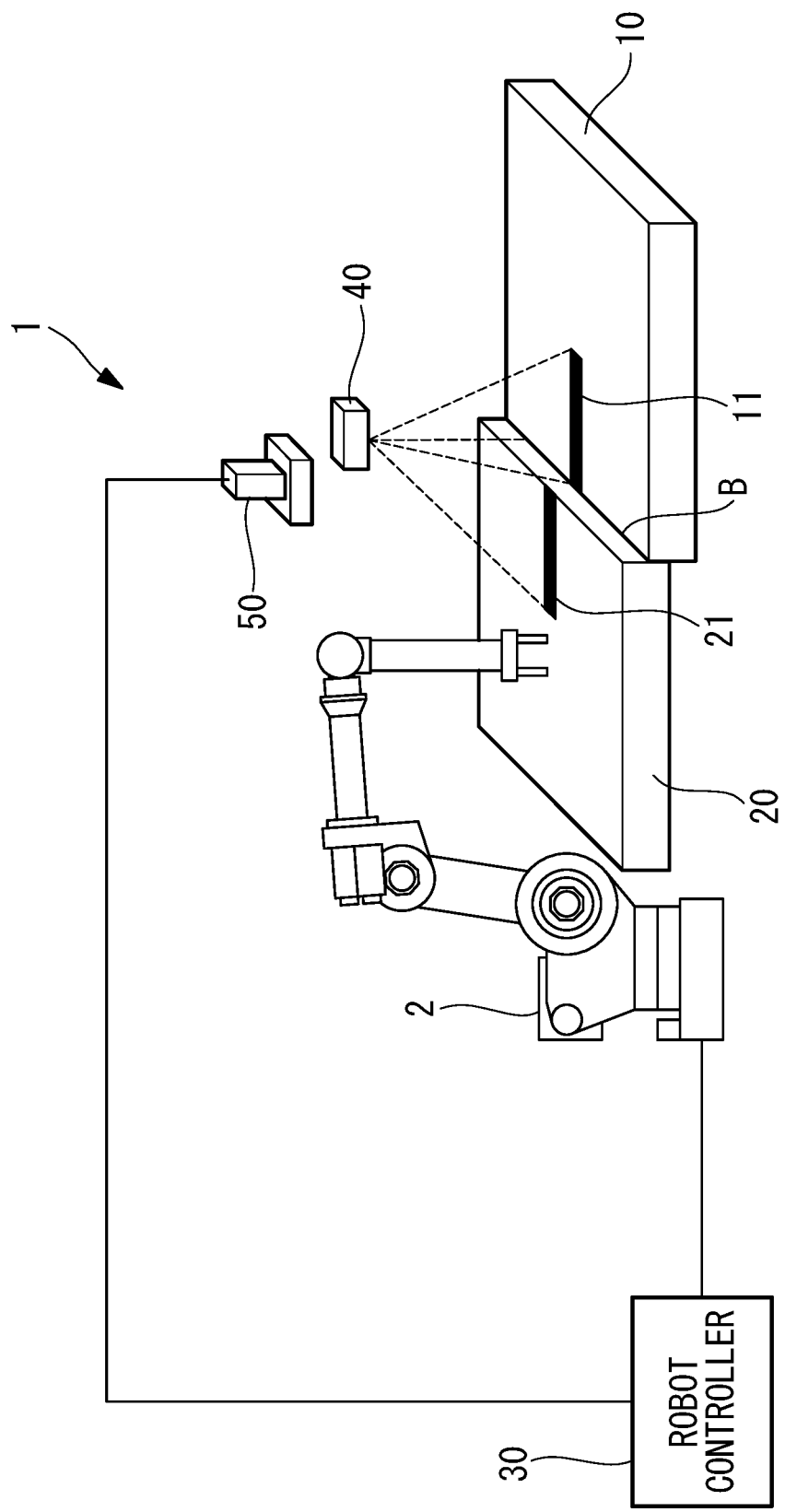
FIG. 1 is an overall configuration diagram of a robot system according to an embodiment of the present disclosure.

A robot system 1 according to an embodiment of the present disclosure will be described below with reference to the drawings.

The robot system 1 according to this embodiment is a system in which, in order to perform welding in a state in which a flat plate-like second base material (second workpiece) 20 is disposed so as to be abutted against one edge of a flat plate-like first base material (first workpiece) 10, the positions of the first base material 10 and the second base material 20 are aligned.

The robot system 1 includes: a robot 2 that grips the second base material 20; a robot controller 30 that controls the operation of the robot 2; an illumination device 40; and a camera 50.

The first base material 10 is, for example, secured on a worktable (not shown) in a substantially horizontally disposed state. The robot 2 substantially horizontally disposes the gripped second base material 20 in the vicinity of the one edge of the first base material 10.

The illumination device 40 is disposed farther above than the first base material 10 is and radiates a slit-like laser beam. The slit-like laser beam extends in a direction orthogonal to a border B between the first base material 10 and the second base material 20 in a state in which the second base material 20 is disposed adjacent to the first base material 10, and is radiated along a plane that is inclined with respect to surfaces of the first base material 10 and the second base material 20 at a predetermined angle.

Specifically, the laser beam is radiated onto the surfaces of the first base material 10 and the second base material 20 along a plane that is inclined with respect to the surfaces of the first base material 10 and the second base material 20 at an angle smaller than 90°.

Accordingly, a first line image 11 that extends in the direction orthogonal to the border B is formed on the surface of the first base material 10, and a second line image 21 that extends in the direction orthogonal to the border B is formed on the surface of the second base material 20.

The camera 50 is also disposed above the first base material 10. In addition, the camera 50 acquires, in a state in which the first line image 11 and the second line image 21 formed on either side of the border B are placed in the angle of view thereof, a two-dimensional image that contains both the first line image 11 and the second line image 21.

The robot controller 30 processes the two-dimensional image acquired by the camera 50 and causes the robot 2 to perform a correction operation.

Specifically, the robot controller 30 measures the misalignment amount and the misalignment direction between the first line image 11 and the second line image 21 in the two-dimensional image, and calculates a correction amount by multiplying the measured misalignment amount by a predetermined constant. Then, the robot controller 30 controls the robot 2 so as to move the second base material 20 toward the opposite side from the measured misalignment direction by an amount corresponding to the calculated correction amount.

Figure 2:
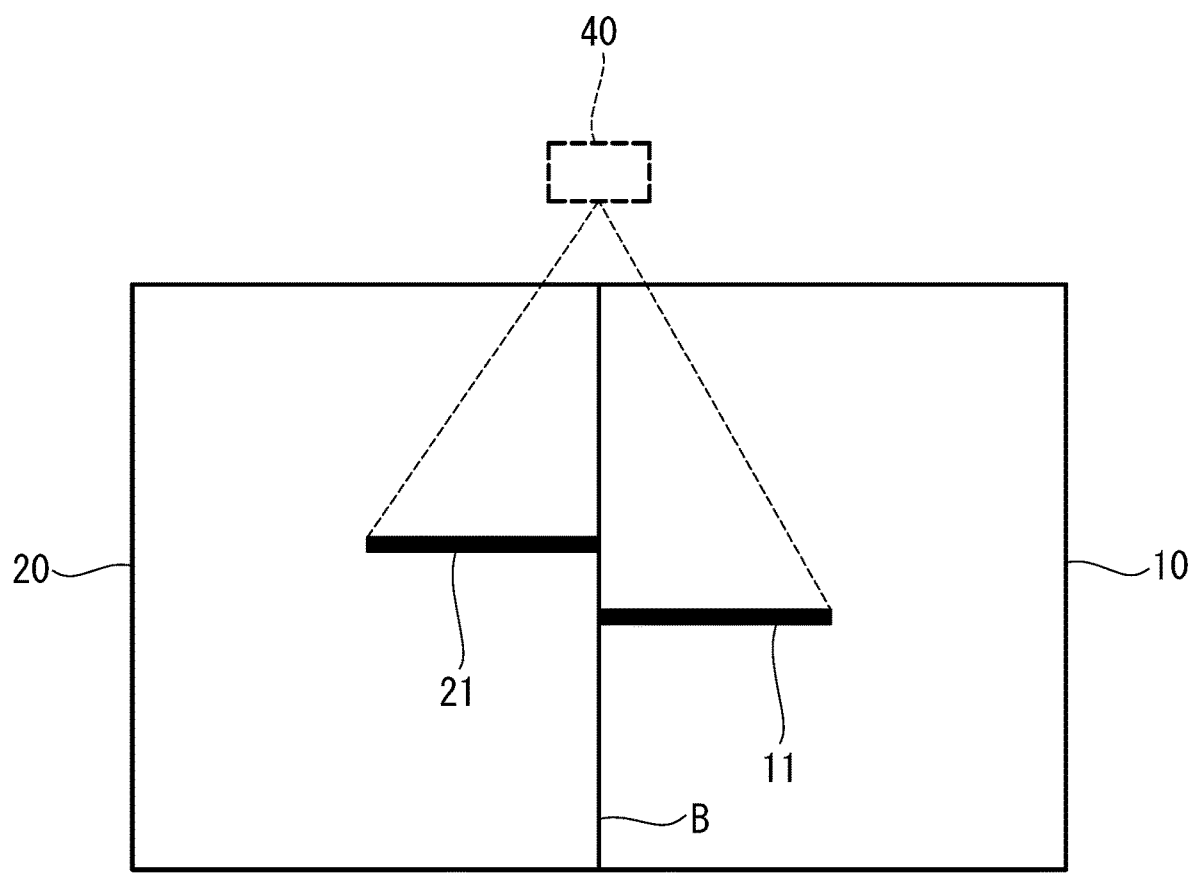
FIG. 2 is a diagram showing positions of a first line image and a second line image in the robot system in FIG. 1.

The misalignment direction between the first line image 11 and the second line image 21 in the two-dimensional image is measured on the basis of the specific direction in which the second line image 21 is misaligned with respect to the first line image 11 in the two-dimensional image. FIG. 2 shows an example of the two-dimensional image in the case in which the illumination device 40 is disposed at the position indicated by reference sign 40. In the case in which the second line image 21 on the left side is disposed on the upper side with respect to the first line image 11 on the right side in this two-dimensional image, it is understood that the second base material 20 is misaligned upward with respect to the first base material 10. In contrast, in the case in which the second line image 21 on the left side is disposed on the lower side with respect to the first line image 11 on the right side in the two-dimensional image, it is understood that the second base material 20 is misaligned downward with respect to the first base material 10.

In addition, the misalignment amount between the first line image 11 and the second line image 21 in the two-dimensional image is measured on the basis of the number of pixels between the first line image 11 and the second line image 21 in the two-dimensional image. The conversion coefficient between the misalignment amount measured on the basis of the number of pixels between the first line image 11 and the second line image 21 in the two-dimensional image and the actual misalignment amount between the first base material 10 and the second base material 20 is roughly set in advance.

In this embodiment, the constant by which the number of pixels is multiplied to calculate a correction amount is a value obtained by multiplying the conversion coefficient by a predetermined decimal number.

The operation of the thus-configured robot system 1 according to this embodiment will be described below.

With the robot system 1 according to this embodiment, once the robot 2 has disposed the second base material 20 at the position adjacent to the one edge of the first base material 10, as shown in FIG. 1, the illumination device 40 radiates the slit-like laser beam.

Accordingly, the laser beam emitted from the illumination device 40 forms the first line image 11 and the second line image 21, which extend in the direction orthogonal to the border B, on the surfaces of the first base material 10 and the second base material 20.

The laser beam is inclined with respect to the surfaces of the first base material 10 and the second base material 20 by an angle smaller than 90°; therefore, if the first base material 10 and the second base material 20 are misaligned in a plate thickness direction, the first line image 11 and the second line image 21 are formed so as to be misaligned with respect to each other in the direction along the border B.

As a result of operating the camera 50 in this state, the two-dimensional image shown in FIG. 2 is acquired and transmitted to the robot controller 30.

The two-dimensional image transmitted from the camera 50 is processed by the robot controller 30.

Accordingly, the number of pixels between the first line image 11 and the second line image 21 in the two-dimensional image is measured. Then, the measured number of pixels is multiplied by the constant obtained by multiplying the positive decimal number by the conversion coefficient between the unit pixel and the actual misalignment amount between the first base material 10 and the second base material 20, and thus, a correction amount corresponding to the measured number of pixels is calculated.

In addition, the offset direction of the second line image 21 with respect to the first line image 11 in the two-dimensional image is detected in the form of the misalignment direction indicating whether the second base material 20 is misaligned upward or downward with respect to the first base material 10. The robot controller 30 determines the direction opposite from the detected misalignment direction between the first base material 10 and the second base material 20 as the correction direction.

Then, the robot controller 30 causes the robot 2 to be moved in the determined correction direction by the amount corresponding to the calculated correction amount.

At this time, even if the value of the conversion coefficient by which the number of pixels is multiplied is not accurate or there is an error in the amount by which the robot 2 is operated in response to a control instruction, it is possible to make the calculated correction amount smaller than the actual misalignment amount as a result of being multiplied by the positive decimal number. Accordingly, the misalignment amount between the first base material 10 and the second base material 20 is corrected without causing the surface of the second base material 20 to go past the surface of the first base material 10.

Furthermore, the robot controller 30 detects the misalignment amount after the correction between the first base material 10 and the second base material 20 again and compares the detected misalignment amount with a predetermined threshold stored in advance.

As a result, if the detected corrected misalignment amount between the first base material 10 and the second base material 20 is greater than the threshold, the robot controller 30 causes the robot 2 to be operated again on the basis of the detected corrected misalignment amount and the misalignment direction between the first base material 10 and the second base material 20.

Accordingly, the misalignment amount between the first base material 10 and the second base material 20 is further reduced from the misalignment amount after the previous correction.

In this way, as a result of repeating the correction operation until the misalignment amount between the first line image 11 and the second line image 21 becomes smaller than the predetermined threshold, the misalignment amount between the first base material 10 and the second base material 20 is asymptotically corrected. In addition, even if this correction operation is repeated, the correction direction is not reversed and is restricted to the same direction; therefore, it is possible to accurately correct the level difference between the first base material 10 and the second base material 20 and it is also possible to simplify the correction control method.

As has been described above, with the robot system 1 according to this embodiment, it is possible to correct the relative position between the first base material 10 and the second base material 20 so as to achieve the optimal state for butt welding, and thus, it is possible to perform good welding.

Note that, in this embodiment, the robot controller 30 calculates the correction amount of the robot 2 on the basis of the misalignment amount between the first line image 11 and the second line image 21 in the two-dimensional image. Alternatively, the robot controller 30 may calculate the correction amount of the robot 2 on the basis of three-dimensional coordinate information in a real space, the information corresponding to the misalignment amount between the first line image 11 and the second line image 21 in the two-dimensional image.

In this case, the camera 50 needs to be calibrated in advance. As a result of the camera 50 being calibrated, it is possible to determine an arbitrary position in the two-dimensional image as a three-dimensional line of sight. Furthermore, the positional relationship between the camera 50 and the slit light beam radiated by the illumination device 40 needs to be calibrated in advance. The slit light beam radiated by the illumination device 40 can be defined as a plane. The positional relationship between this plane and the camera 50 may be measured in advance and stored as calibration information. By taking the intersection between the lines of sight pointing to arbitrary points in the first line image 11 and the second line image 21 detected in the two-dimensional image and the plane of the slit light beam, it is possible to determine three-dimensional positional information of the arbitrary points in the first line image 11 and the second line image 21. Accordingly, it is possible to acquire a three-dimensional line image in the first line image 11 and the second line image 21.

Therefore, the robot controller 30 can convert, to a three-dimensional misalignment amount and a misalignment direction in the real space, the misalignment amount and the misalignment direction between the first line image 11 and the second line image 21 at the border B between the first base material 10 and the second base material 20 in the two-dimensional image. Then, the robot controller 30 causes the robot 2 to be operated by an amount corresponding to a correction amount calculated on the basis of the converted three-dimensional misalignment (the misalignment amount and the misalignment direction).

As a result, it is possible to correct a misalignment between the first base material 10 and the second base material 20 with greater accuracy.

In addition, in this embodiment, the robot controller 30 corrects the misalignment amount in the plate thickness direction between the surface of the first base material 10 and the surface of the second base material 20 on the basis of the misalignment amount and the misalignment direction between the first line image 11 and the second line image 21 in the two-dimensional image. In addition to this correction, an inclination between the surface of the first base material 10 and the surface of the second base material 20 may be corrected on the basis of an inclination of the second line image 21 with respect to the first line image 11.

Figure 3:
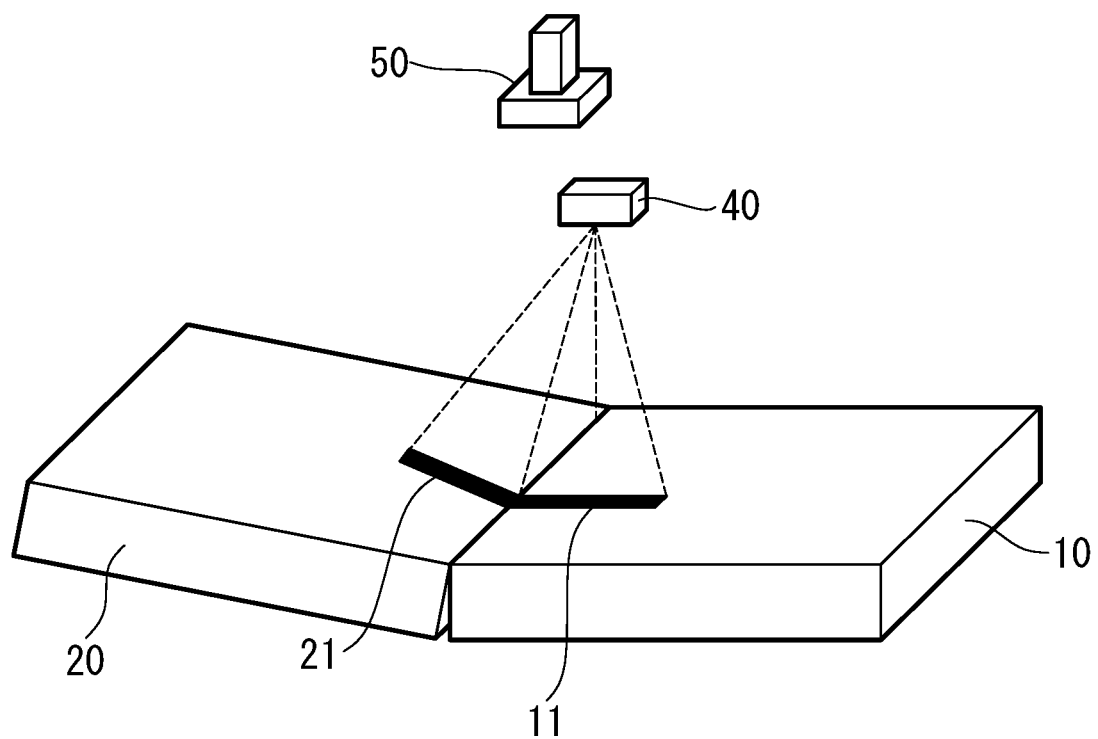
FIG. 3 is a diagram showing a state in which a surface of a second base material is inclined with respect to a surface of a first base material in the robot system in FIG. 1.
Figure 4:
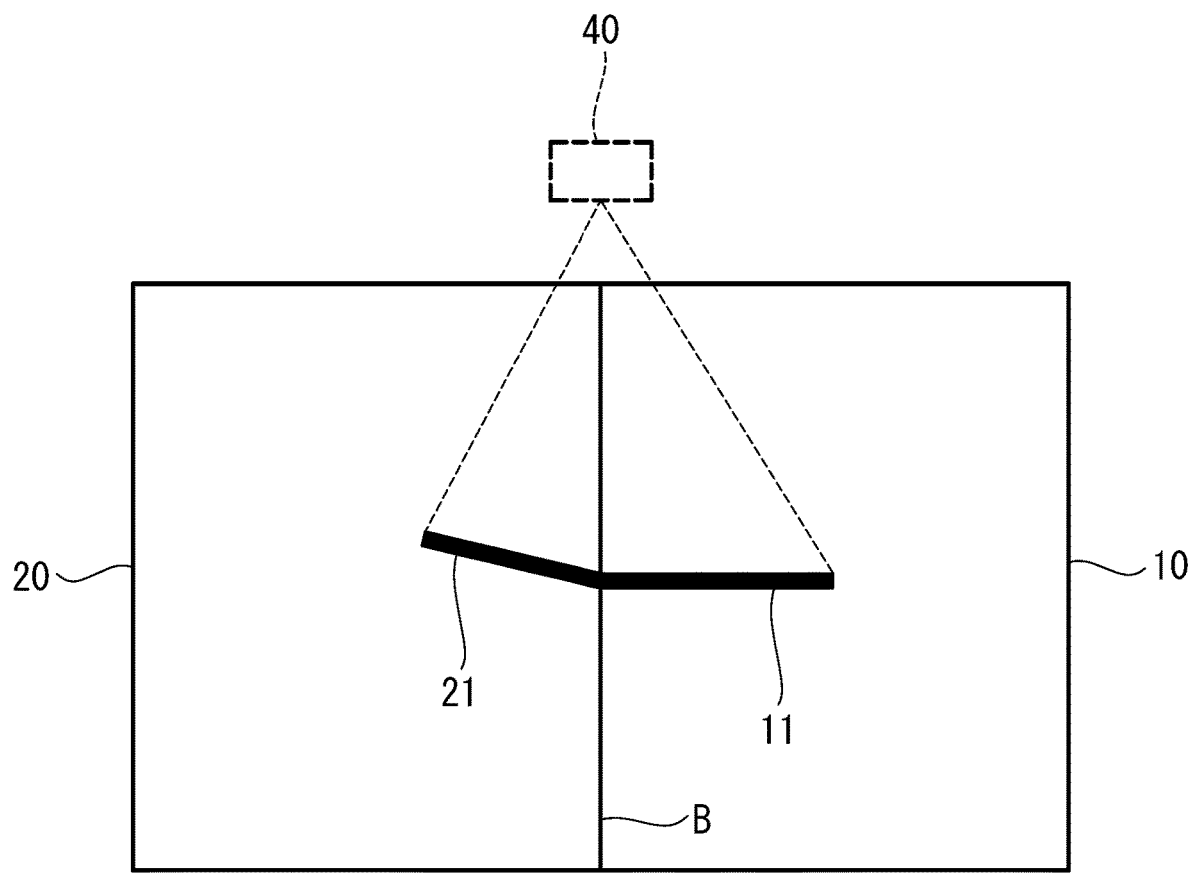
FIG. 4 is a diagram showing the positions of the first line image and the second line image in the robot system in the state shown in FIG. 3.

For example, as shown in FIGS. 3 and 4, in the case in which the surface of the second base material 20 is disposed in an inclined manner with respect to the surface of the first base material 10, the second line image 21 is also formed in an inclined manner with respect to the first line image 11 in correspondence to the inclination between the surface of the first base material 10 and the surface of the second base material 20.

The robot controller 30 associates the angle formed between the first line image 11 and the second line image 21 with the inclination direction and the inclination angle between the surface of the first base material 10 and the surface of the second base material 20 in advance on the basis of the irradiation angle of the laser beam and the positional information of the camera 50. Then, as a result of the robot controller 30 causing the robot 2 to be operated on the basis of the angle formed between the first line image 11 and the second line image 21, it is possible to correct the inclination between the surface of the first base material 10 and the surface of the second base material 20.

In this case, it is preferable that the correction of the inclination of the second base material 20 by the robot 2 be performed, for example, by disposing a distal-end point of a tool of the robot 2 on an edge of the second base material 20 adjacent to the border B and by causing the second base material 20 to be rotated about a coordinate axis extending along the edge of the second base material 20. Accordingly, it is possible to make the inclination of the second line image 21 parallel to the first line image 11 without moving the position of a distal end of the second line image 21 in the proximity of the border B.

Also, as a result of subsequently performing the correction described above in which the first line image 11 and the second line image 21 are aligned with each other, it is possible to precisely align the first base material 10 and the second base material 20, and thus, it is possible to more appropriately perform welding.

In addition, in this embodiment, the first base material 10 and the second base material 20 having a flat plate-like shape have been described as examples; however, there is no limitation thereto, and base materials having arbitrary shapes may be employed.

In addition, in this embodiment, the misalignment amount between the first line image 11 and the second line image 21 in the two-dimensional image is determined on the basis of the number of pixels, and the correction amount is determined by multiplying the number of pixels by the constant obtained by multiplying the conversion coefficient by the positive decimal number; however, alternatively, a constant obtained by multiplying the conversion coefficient by a coefficient that is equal to or greater than 1 may be employed.

In this case, although the correction operation by the robot 2 becomes oscillatory, there are cases in which it is possible to more quickly complete aligning.

In addition, in this embodiment, although the robot system that performs butt welding of the first base material 10 and the second base material 20 has been described as an example, there is no limitation thereto, and a robot system performing any work may be employed so long as the work requires aligning of a level difference between surfaces of adjacent workpieces.

The invention claimed is:

1. A robot system, comprising:
   a robot that grips at least one of a first workpiece and a second workpiece that are disposed adjacent to each other;
   an illumination device that radiates a slit-like light beam onto surfaces of the first workpiece and the second workpiece on either side of a border between the first workpiece and the second workpiece along a plane that intersects the border;
   a camera that captures, from a direction inclined with respect to the plane, an image containing a first line image of the light beam formed on the surface of the first workpiece and a second line image of the light beam formed on the surface of the second workpiece; and
   a robot controller that causes the robot to be operated on the basis of a misalignment amount and a misalignment direction of the second line image with respect to the first line image in the image acquired by the camera and that performs a correction of a level difference between the surface of the first workpiece and the surface of the second workpiece.

2. The robot system according to claim 1, wherein:
   the camera acquires a two-dimensional image; and
   the robot controller causes the robot to be operated by a correction amount in accordance with a number of pixels that corresponds to the misalignment amount between the first line image and the second line image at a position of the border in the acquired two-dimensional image.

3. The robot system according to claim 2, wherein the robot controller calculates the correction amount on the basis of the number of pixels multiplied by a positive decimal number.

4. The robot system according to claim 1, wherein:
   the illumination device and the camera are calibrated in advance;
   the camera acquires a two-dimensional image; and
   the robot controller calculates, on the basis of the first line image and the second line image in the acquired two-dimensional image, a three-dimensional misalignment between the first line image and the second line image at a position of the border in the two-dimensional image and causes the robot to be operated by a correction amount calculated on the basis of the calculated three-dimensional misalignment.

5. The robot system according to claim 1, wherein the robot controller repeats the correction until the misalignment amount between the first line image and the second line image after the correction becomes smaller than a threshold set in advance.

6. The robot system according to claim 1, wherein the robot controller performs a correction of an inclination between the surface of the first workpiece and the surface of the second workpiece on the basis of an inclination of the second line image with respect to the first line image.

* * * * *